United States Patent [19]

McDonough

[11] Patent Number: 5,052,792

[45] Date of Patent: Oct. 1, 1991

[54] SELECTIVELY POSITIONABLE REAR VIEW MIRROR SYSTEM FOR VEHICLES WITH TWO MIRROR SEGMENTS AND CONTROL CIRCUIT COOPERATING WITH TURN SIGNAL SYSTEM

[76] Inventor: Michael J. McDonough, 11722 Fawnview, Houston, Tex. 77070

[21] Appl. No.: 509,327

[22] Filed: Apr. 16, 1990

[51] Int. Cl.⁵ .................... B60R 1/06; B60R 1/08; G02B 7/18; G02B 5/08
[52] U.S. Cl. ................................. 359/843; 359/846; 359/865; 359/866; 359/868; 359/877
[58] Field of Search ............... 350/605, 606, 607, 608, 350/626, 627, 637, 612, 625, 629

[56] References Cited

U.S. PATENT DOCUMENTS

| | | | |
|---|---|---|---|
| 1,910,119 | 5/1933 | Moats | 350/608 |
| 2,718,175 | 9/1955 | Gim | 350/637 |
| 3,522,583 | 8/1970 | Russell | 350/605 |
| 4,105,301 | 8/1978 | Doeg | 350/637 |
| 4,171,875 | 10/1979 | Taylor et al. | 350/637 |
| 4,519,677 | 5/1985 | Weber et al. | 350/637 |
| 4,678,294 | 7/1987 | Van Nostrand | 350/612 |
| 4,820,032 | 4/1989 | Thompson | 350/605 |
| 4,906,089 | 3/1990 | Biondi et al. | 350/605 |

FOREIGN PATENT DOCUMENTS

| | | | |
|---|---|---|---|
| 670080 | 10/1965 | Belgium | 350/607 |
| 2036818 | 1/1972 | Fed. Rep. of Germany | 350/637 |
| 2736900 | 3/1979 | Fed. Rep. of Germany | 350/637 |
| 3502203 | 7/1986 | Fed. Rep. of Germany | 350/612 |
| 3509653 | 9/1986 | Fed. Rep. of Germany | 350/637 |
| 3805125 | 8/1989 | Fed. Rep. of Germany | 350/637 |

Primary Examiner—Jon W. Henry
Attorney, Agent, or Firm—Bernard A. Reiter; James L. Jackson

[57] ABSTRACT

An automatically positionable rear view mirror assembly for automotive vehicles having a turn signal lever. The mirror assembly incorporates a housing that is supported by automotive vehicle and encloses a movable mirror assembly adapted for movement to first and second positions relative to the mirror housing. Motor means such as a solenoid motor is located within the mirror housing and includes an actuating shaft operatively interconnected with the movable mirror. The motor means includes a control circuit having a switch coupled with the circuitry of the automotive vehicle, the switch being operated by the turn signal lever of the automotive vehicle, whereby the mirror is automatically positioned responsive to selective positioning of the turn signal lever. The mirror assembly preferably includes a fixed mirror segment and a movable mirror segment, the movable mirror segment being operated by the motor means.

20 Claims, 2 Drawing Sheets

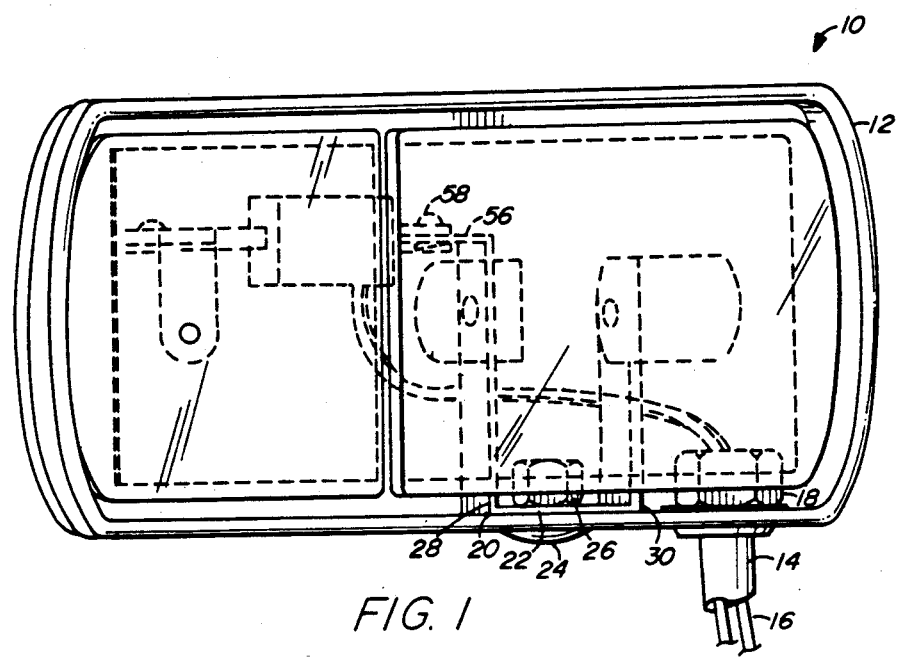
FIG. 1
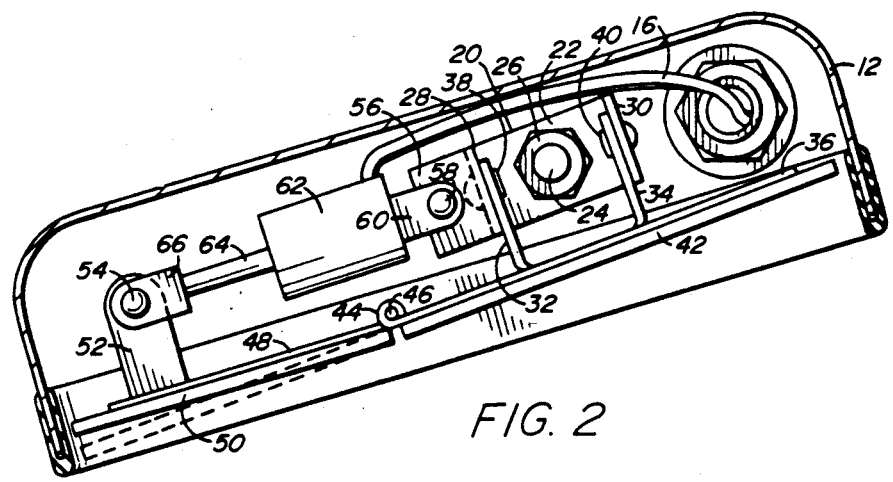
FIG. 2
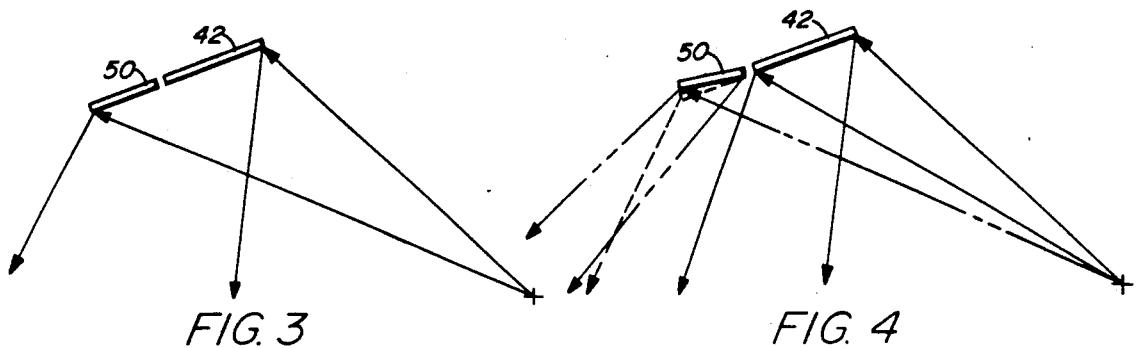
FIG. 3
FIG. 4

SELECTIVELY POSITIONABLE REAR VIEW MIRROR SYSTEM FOR VEHICLES WITH TWO MIRROR SEGMENTS AND CONTROL CIRCUIT COOPERATING WITH TURN SIGNAL SYSTEM

FIELD OF THE INVENTION

This invention relates generally to rear view mirrors of the type that are typically utilized by virtually all classes of automotive vehicles and particulary but not exclusively to those rear view mirrors that are mounted externally of the vehicles. More specifically the present invention is directed to an automatically actuated rear view mirror mechanism having a movable mirror element that is oriented at a predetermined position responsive to activation of the turn signal of the vehicle to provide the operator of the vehicle with a preselected view to the rear. This mirror system will enable the driver to more safely change lanes and negotiate turns more easily and, to more safely execute backing maneuvers. The mirror system will also enable drivers to have the selective capability of viewing areas to the rear that would ordinarily be beyond the field of an ordinary rear view mirror system, these often being referred to as "blind spots".

BACKGROUND OF THE INVENTION

Various types of automotive vehicles such as automobiles, light trucks and tractor trailer trucks are provided with externally mounted rear view mirrors to enable the driver to have a relatively wide view of the rear field. Particularly, in the case of trucks, especially trucks towing semi-trailers, the negotiation of turns causes the driver to have a significant "blind spot" such that adequate rear viewing cannot be ordinarily accomplished, and in all vehicles, changing lanes on freeways causes a "blind spot" on both left and right sides of the vehicle. This disadvantageous "blind spot" condition has been widely recognised. Consequently, various mirror systems have been developed that will induce automatic mirror adjustment in response to a turning of a tractor trailer vehicle. For example, U.S. Pat. Nos. 3,166,630, 3,208,343, 3,563,639 are exemplary of automatically adjustable mirror systems that have been developed especially for tractor trailer vehicles. In some cases the mirrors are automatically adjustable by a mechanical system that is activated as the tractor and trailer become angulated, such as during a sharp turn or when the vehicle is accomplishing a controlled backing maneuver with the trailer turning. Electrically energized automatically adjustable mirror systems have also been developed for accomplishing mirror movement such as is shown by U.S. Pat. No. 2,871,761 of Snyder.

SUMMARY OF THE INVENTION

It is a principle feature of the present invention to provide a mirror system for automotive vehicles which is automatically pivotally movable to a pre-selective position responsive to selective positioning of the turn signal lever of the automotive vehicle to thereby enable the driver to visualize a pre-determined "blind spot" prior to or during lane changes, turns or backing maneuvers.

It is also a feature of this invention to provide a novel rear view mirror system for automotive vehicles that incorporates a fixed mirror segment or component which is positioned for normal rear viewing and a movable mirror component segment or section which is positionable at two or more preselected mirror positions responsive to movement of the turn signal 1 ⓡv ⓡr of the automotive vehicle.

It is an even further feature of this invention to provide a novel automatically positionable rear view mirror system having a mirror which is of variable curvature and which is activated from a pre-determined configuration to a preselected configuration by suitable motor means in response to selective activation of the turn signal lever of an automotive vehicle.

Briefly, the concept and desired results of the present invention are achieved through provision of an automatically positionable rear view mirror mechanism that incorporates a housing structure which is suitably supported exteriorly (or interiorly) of the automotive vehicle. Within the mirror housing is provided a mirror or segment of a mirror which is movable and which is preferably pivotally mounted. This movable mirror or segment is adapted for positioning at two or more mirror positions by means of a suitable motor mechanism such as an electric solenoid motor, vacuum or pneumatic actuator or the equivalent. The first or normal position of the mirror would be established when the solenoid motor is deenergized and the second or wide view position of the mirror would be established when the motor mechanism for simplicity sake referred to as a solenoid motor is energized. The apparatus may incorporate an electric circuit for the solenoid motor which includes a switch which is coupled with the electrical circuitry of the vehicle and is activated by the turn signal of the automotive vehicle. Upon activation of the turn signal switch the motor circuit is energized, thereby accomplishing movement of the mirror segment from a normal position to a preselected mirror position or positions. Both the normal and preselected positions of the mirror may be adjusted to suit the needs of the vehicle operator.

Preferably, the mirror assembly of the present invention incorporates a stationery mirror segment which is capable of movement within the housing only for the purpose of adjusting the normal rear view mirror position as desired by the operator of the vehicle. Adjacently to the stationery mirror segment there is mounted a pivotal mirror section or sections and which is capable of movement from a normal position in generally coplanar registry with the stationery mirror to a preselected position which is angulated with respect to the stationery mirror. The solenoid motor or other suitable mechanism is operatively interconnected to the pivotal mirror segment. Upon actuation of the turn signal lever of the vehicle the turn signal switch energizes the motor circuit and activates the electric motor which shifts the movable mirror segment to its preselected secondary position.

Another feature of the invention is the provision of an automatically adjustable mirror assembly which will incorporate a flexible mirror having a section at one end which remains substantially fixed and generally planar. The opposite end of the flexible mirror is freely movable and is interconnected through a suitable linkage with an electrically, vacuum or pneumatically energized motor mechanism such as a solenoid motor. The solenoid motor is provided with a circuit for its operation which is coupled with electrical circuitry of the vehicle and incorporates a switch which is operative by the turn signal mechanism of the vehicle. Unless otherwise adjusted, the entire mirror will be planar at one motor position to provide a normal rear view and a section of the mirror will be bent to an angulated relation with a fixed mirror segment to thus provide the vehicle operator with a panoramic view to the rear of the vehicle.

BRIEF DESCRIPTION OF THE DRAWINGS

So that the manner in which the above recited features, advantages and objections of the present invention are attained and can be understood in detail, a more particular description of the invention, briefly summarized above, may be had by reference to the embodiments thereof which are illustrated in the appended drawings.

It is to be noted, however, that the appended drawings illustrate only typically embodiments of this invention and are therefore not to be considered limiting of its scope, for the invention may admit to other equally effective embodiments.

FIG. 1 is an elevational view of a vehicle mirror system that is constructed in accordance with the features of this invention.

FIG. 2 is a section view in plan, illustrating further details of the mirror assembly of FIG. 1.

FIG. 3 is a graphical representation illustrating the normal view seen by the driver of a vehicle with the mirror assembly of FIG. 1 in its normal position.

FIG. 4 is a graphical representation similar to that of FIG. 3 and illustrating the fields of view that are visible to the driver with movable segment of the mirror assembly of FIG. 1 shifted to is predetermined position.

DETAILED DESCRIPTION OF PREFERRED EMBODIMENT

Figure 5:
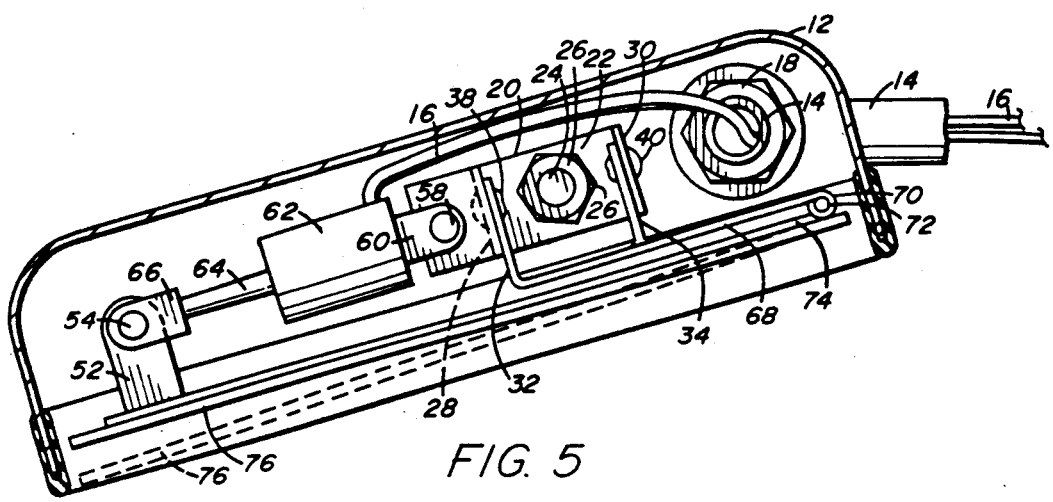
FIG. 5 is a sectional view in plan, illustrating a mirror assembly having a single elongated pivotal mirror and representing an alternative embodiment of this invention.

Referring now to the drawings and first to FIGS. 1 and 2, a mirror assembly for automotive vehicles which is constructed in accordance with this invention is illustrated generally at 10. The mirror assembly 10 incorporates a mirror housing 12 which includes a support structure 14 that is adapted for mounting to a vehicle structure in the manner illustrated in FIG. 7 for the purpose of supporting the mirror assembly externally or internally of the vehicle. The mirror support 14 may secure the mirror housing in fixed relation to the vehicle structure or, if desired, may support the housing of the mirror assembly in adjustable relation with the vehicle structure. The mirror support 14 also provides a protective conduit through which control circuit conductors 16 extend into the vehicle for connection to the circuitry of the vehicle. As shown the mirror support is secured with respect to the mirror housing 12 by means of a lock nut 18. This particular type of mirror housing support should not be considered as limiting the scope of this invention. Any other type of mirror support assembly may be utilized within the spirit and scope of this invention.

Within the mirror housing 12 is provided a generally U-shaped mirror support element 20 having a base 22 which is secured to the housing by means of a bolt 24 and nut 26. Upon loosening of the nut 26, the base 22 is rotatably adjustable about a generally vertical axis established by the bolt 24. From the base 22 extends a pair of upright support members 28 and 30 which may be integral with the base if desired. The respective spaced generally parallel arms 32 and 34 of a mirror support plate or element 36 are secured by pivot members 38 and 40 to the spaced support members 28 and 30 of the mirror support element 20. The pivot members 38 and 40 establish an axis of mirror adjustment which is in transverse or generally normal relation with the generally vertical axis established by the bolt 24. There axis establish "X" and "Y" axes for manual adjustment of the mirror support assembly. A generally planar mirror 42 is secured to the mirror support plate 36. The mirror 42 is adjustable by virtue of the generally horizontal pivots 38 and 40 and by the vertical pivot established by the bolt and nut assembly 24 with respect to the base 22 of the support element 20. Thus, with the nut tightened only sufficiently to prevent inadvertent pivoting of the base 22, the driver of the automotive vehicle may grasp and manually adjust the position of the mirror 42 such that the rear view that it provides is in the nature of a "normal" rear view.

According to the principles of this invention the mirror assembly of the vehicle has the capability of automatically shifting the mirror or a selected portion thereof to a preselected position upon actuation of the turn signal lever of the vehicle to a predetermined position. Accordingly, as is evident from FIG. 2, the mirror support 36 includes pivot 44 at one end thereof which includes a hinge or pivot pin 46 to provide pivotal support for a movable mirror support structure 48. The mirror support 48 provides support and positioning control for a movable mirror segment 50 which is supported in fixed relation to the movable mirror support 48. The pivotal connection established by components 44-46 maybe in the form of a simple hinge if desired or, in the alternative, may take any other suitable form within the spirit and scope of the present invention. The movable mirror support 48 is provided with a transverse connector element 52 having an aperture formed therein to receive a connector pin 54. A motor connector 56 extends transversely from the upright mirror support member 28 and forms an aperture adapted to receive a connector pin 58. A clevis or other suitable connector 60 extending from an electric, vacuum or pneumatic motor 62 is secured to the transverse motor support 56 by means of the connector pin 58. The motor 62, as earlier noted is preferably an electric solenoid motor, though it may take any other suitable form without departing from the spirit or scope hereof. The motor 62 is provided with a mirror actuating shaft 64 which is linearly movable upon energization of the motor 62. The actuating shaft is provided with a clevis 66 or other suitable connector at its free extremity which is adapted to receive the connector pin 54 to establish a secure driving relation between the shaft 64 and the transverse connector 52 of the movable mirror support member 48. The electrical conductors 16 extend from the motor 62 through the housing and mirror support structure 14 to the electrical system of the automotive vehicle.

The actuating shaft 64 extending from the motor 62 is adjustable in length at the motor or at the clevis to provide preselected linear movement responsive to energization of the electric motor. This predetermined linear movement achieves angular positioning of the movable mirror segment 50 to a preselected location upon energization of the motor. For example, as shown in broken lines in FIG. 2, the movable mirror segment 50 is shown to be positioned in substantially coplanar relationship with the fixed mirror segment 42. This would be the "normal" position of the mirror assembly for highway traveling. In this "normal" position the field of view from the mirror segments 42 and 50 will be approximately the same as if a single elongated mirror were provided. This normal field of view is shown graphically in FIG. 3. Upon energization of the solenoid motor 62 the actuator shaft 64 is driven in a direction toward the motor and to a predetermined position, thus causing movement of the mirror segment 50 to the full line position thereof as shown in FIG. 2.

At its full line position the movable mirror segment 50 will be disposed in angulated relation with respect to the fixed mirror segment 42 thus causing the field of view observed by the operator of the vehicle to be as shown graphically in FIG. 4. As shown in FIG. 4 the field of view presented by the movable mirror segment will have been rotated outwardly, thus providing the operator of the vehicle with the capability of observing a preselected significantly wider area to the rear of the vehicle such that blind spots can be observed during lane changes, as well as the rear portion of the trailer of a tractor trailer assembly is capable of being visually inspected during tight turning maneuvers, backing, etc. The preselected position of the movable mirror segment may be altered to suit the needs of the vehicle operator simply by adjusting the effective length of the actuating shaft 64. For example, the shaft 64 will typically have a threaded connection with the clevis member 66. By appropriately rotating the shaft 64 this threaded engagement will achieve controlled adjustment of the effective length the actuating shaft and clevis. Thus, the operator of the vehicle can insure that the movable mirror segment will move to a position that is preselected by the vehicle operator by appropriate motor shaft adjustment. Likewise, though the position of the mirror segment 42 is fixed during normal operation, its position is also adjustable by the vehicle operator to ensure that the normal rear field of view is properly oriented for the vehicle operator.

With reference now to FIG. 5 an alternative embodiment of the present invention is disclosed which employs a single elongated mirror segment which is pivotally mounted within the mirror housing and is positionable from a normal broken line position to a preselected full line position upon energization of the mirror actuating motor 62. For purposes of simplicity like parts are indicated by like reference numerals in comparison with FIGS. 1 and 2. The mirror housing 12 is supported on a vehicle structure by means of a support 14 which is adjustable in the manner described above in connection with FIGS. 1 and 2. The mirror support element 20, which is secured in fixed relation with respect to the housing 12, is substantially identical with the structures shown in FIG. 2. The spaced support elements 28 and 30 provide pivotal support for spaced arms 32 and 34 of a mirror support structure by virtue of pivots 38 and 40. The mirror support also incorporates a transversely extending support member 68 having a hinge or pivot element 70 positioned at the free extremity thereof. An elongated movable mirror support element 74 is adapted at one end thereof for connection to the hinge or pivot 70 by means of a hinge pin 72. An elongated planar mirror 76 is disposed in assembly with the mirror support 74 and thus is pivotal along with the mirror support from the broken line position to the full line position of FIG. 5. The broken line position is the "normal" position of the mirror which provides the operator of the vehicle with a predetermined normal rear view as the vehicle is being driven in substantially straight line fashion on a highway. The full line position of the mirror 76 is the position at the mirror assumes in response to positioning of the mirror support upon actuation of the solenoid motor 62. At the free extremity of the mirror support 74 is provided a transverse connector 52 which is assembled with the clevis connector 66 of the motor shaft 64 by means of a connector pin 54. Upon energization of the motor 62 the motor shaft 64 is caused to move linearly toward the motor, thus causing the clevis connector and transverse shaft to impart pivotal movement to the mirror support and mirror about the hinge pin 72.

The normal operating position of the mirror is adjustable through rotatable adjustment of the support base 22 about a pivot established by the bolt 24, representing a generally vertical axis, and by adjustment of the mirror support arms 32 and 34 about the pivot elements 38 and 40, representing a generally horizontal axis. Likewise, the actuated position of the mirror, as shown in full line, may be adjusted by appropriate manipulation of the actuator shaft 64 with respect to its threaded connection with the connector clevis 66 to alter its effective length. After the "normal" and motor actuated positions of the mirror have been established the operator of the vehicle may then control these preselected positions of the mirror simply by energization and deenergization of the solenoid motor 62 through actuation of the turn signal lever of the vehicle as explained below.

Figure 6:
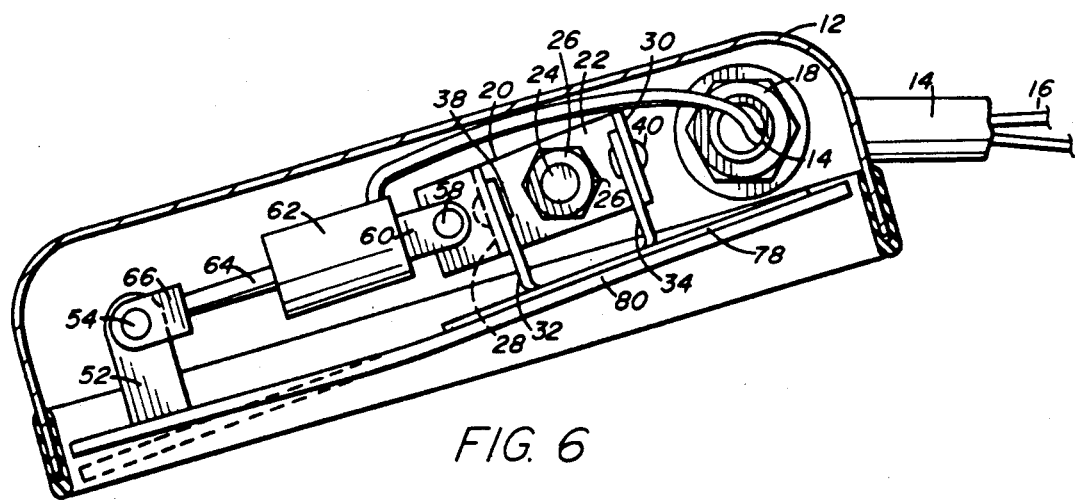
FIG. 6 is a sectional view in plan, illustrating a vehicle mirror assembly representing a further alternative embodiment of this invention and incorporating a flexible mirror having a portion that remains substantially fixed and a portion that is movable.

With reference now to FIG. 6 a further alternative embodiment of this invention is disclosed wherein an elongated flexible mirror is flexed at it free extremity to provide the operator of the vehicle with an enlarged, wider rear view upon appropriate motor actuation. As shown in FIG. 6 the housing 12 is provided with support structure 14 essentially as discussed above in connection with FIGS. 1, 2 and 5. The basic structure of the mirror support 20 incorporates a support base 22 secured by bolt 24 and nut 26 to the mirror housing and having upstanding spaced support members 28 and 30 to which spaced mirror support arms 32 and 34 are secured by means of pivot members 38 and 40. The mirror support arms 32 and 34 are preferably formed integrally with an elongated generally planar mirror support plate or element 78 which has a length significantly less than the overall length of a flexible mirror 80 that is fixedly supported thereby. That portion of the mirror 80 which is fixed to the mirror support element 78 remains substantially planar to thus provide the operator of the vehicle with the capability of observing a normal rear view. That portion of the mirror, however, which projects laterally beyond the left extremity of the mirror support element 78 is capable of being flexed from the broken line position to the full line position as shown in FIG. 6 upon energization of the solenoid motor 62. In its flexed condition the entire mirror would provide the vehicle operator with a panoramic view to the rear of the vehicle. A transverse connector element 52 extends from the rear portion of the flexible mirror and is connected by a pin 54 to the clevis connection 66 of an operating shaft 64 extending from the solenoid motor 62. As the solenoid motor is energized the shaft 64 is urged in a direction toward the motor 62, thereby causing the force of the motor to be translated linearly through the shaft 64 of the connecting clevis 66 and the transverse connector 52 to the flexible mirror. This force translation causes the flexible end portion of the mirror to be flexed in the manner shown in FIG. 6 to thus provide the operator of the vehicle with a panoramic rear view of the vehicle and its operating environment. The degree of flexure of the mirror 80 may be controlled by adjustment of the effective length of the operating shaft 64 in the same manner as described above in connection with FIG. 5. Likewise, the position of the planar right hand portion of the mirror 80 may be adjusted by adjusting the position of the support base 22 about the generally vertical axis established by the bolt 24 and by pivotal adjustment of the support arms 32 and 34 about the generally horizontal axis established by respective pivots 38 and 40.

Figure 7:
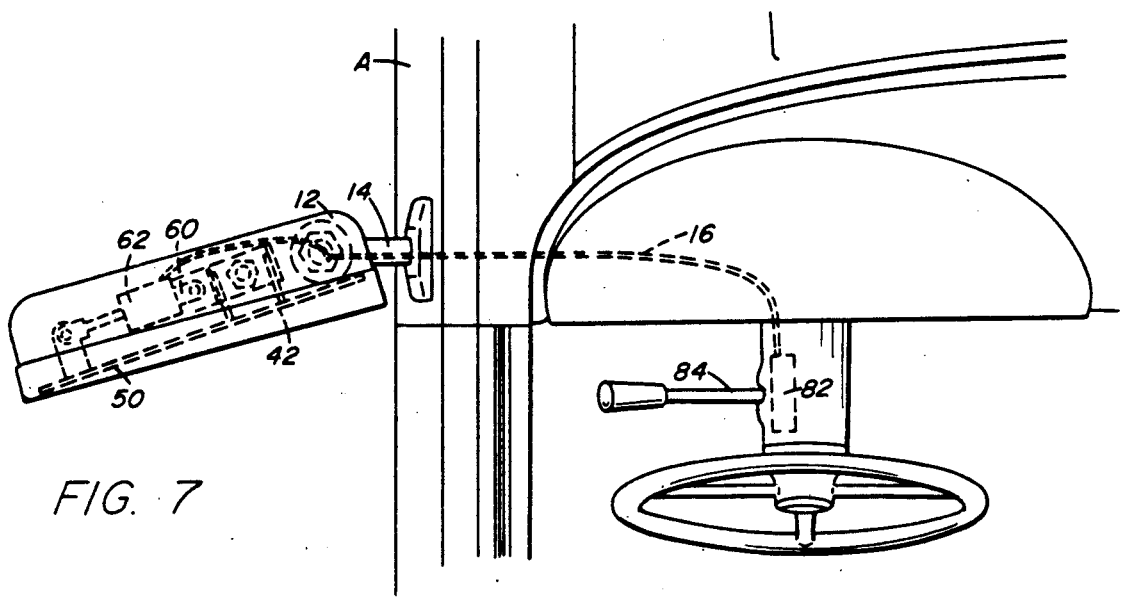
FIG. 7 is a plan view of a portion of an automotive vehicle illustrating the mirror assembly of this invention and its turn signal control system.

Referring now to FIG. 7 an automotive vehicle is illustrated generally at "A" with the mirror assembly 12 shown to be supported externally by support structure 14 which is fixed to a side portion of the vehicle. As shown in broken lines at 16 in FIG. 7 the electrical circuit extending from the solenoid motor 62 through the mirror housing and mirror support also extends to a switch 82 which is mounted on or within the steering post of the automotive vehicle. The switch 82 is operatively associated with the turn signal lever 84 of the automotive vehicle. As the turn signal is moved to a predetermined operative position, such as when a left turn is designated, the switch 82 is actuated, thereby causing energization of the electrical circuit solenoid motor 62. The electrical switch, which is interconnected with the electrical circuitry of the automotive vehicle, may be capable of transmitting mirror actuation signals for both left hand and right hand mirrors in the event such is desired. In such event the switch would be coupled with two motor control circuits which would be selectively energized by right or left turn movement of the turn signal lever. As shown in FIG. 7, however, for the purpose of simplicity a left hand mirror is shown and a single motor circuit is shown. Its operation would normally be induced by movement of the turn signal lever 84 to the position selected for a left turn. If a right hand mirror is also provided on the automotive vehicle, the switch 82 would be capable of actuation by the turn signal lever for both right and left turns and the appropriate mirror would be energized by selective positioning of the turn signal lever.

In view of the foregoing it is evident that the present invention provides a novel mirror assembly which is energized upon appropriate actuation of the turn signal of an automotive vehicle and which automatically positions the mirror assembly such that the operator of the vehicle is provided with a preselected wide or panoramic view to the rear of the vehicle. This provides the rear position of a trailer operator with the capability of visually inspecting the vehicle even under circumstances where the trailer is substantially angulated with respect to the tractor. Also it affords markedly enhanced safety immediately on lane changing since the mirror assembly is actuated upon movement of the turn signal lever of the vehicle it is not necessary for the operator of the vehicle to direct his attentions specifically to the mirror operation. The mirror assembly will be automatically positioned as preselected by the vehicle operator during normal operation of the vehicle and during normal operation of the turn signal of the vehicle.

In view of the foregoing it is apparent that the present invention is one well adapted to attain all of the objects and features hereinabove set forth together with other features that are inherent in the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit and scope thereof, it is to be understood that all matters hereinabove set forth or shown in the accompanying drawings are to be interpreted as illustrative and not in any limiting sense.

What is claimed is:

1. An automatically positionable mirror assembly for automotive vehicles having a turn signal system having a manually actuated turn signal lever comprising:
   (a) a mirror housing adapted to be supported on the automotive vehicle;
   (b) mirror means being movably supported by said mirror housing and wherein, said mirror means comprises a first mirror segment immovably supported within said housing and a second mirror segment being positionable at first and second preselected positions within said housing;
   (c) motor means being carried by the vehicle and having an operative interconnection with said mirror means and adapted upon energization to induce movement of said mirror means from said first preselected positions to said second preselected position; and
   (d) a control circuit interconnected between said motor means such that upon actuation of the lever said motor means causes movement of the mirror means from said first position to said second position.

2. The mirror assembly of claim 1, wherein:
said second mirror segment is movably interconnected with said first mirror segment and is substantially coplanar with said first mirror segment during deenergization of said motor means and is disposed in angular relation with said first mirror segment upon energization of said motor means.

3. The mirror assembly of claim 1, wherein:
   (a) mirror support is located within said housing and is manually adjustable relative to said housing; and
   (b) at least a portion of said mirror means is secured in fixed relation to said mirror support.

4. The mirror assembly of claim 3, wherein
said motor means is secured to said mirror support and includes an actuator shaft capable of linear movement, said actuator shaft being operatively interconnected with said movably supported mirror means and accomplishing pivotal movement of said mirror means to a preselected position upon energization of said motor means.

5. The mirror assembly of claim 1, wherein:
said movably supported mirror means includes a connector element extending therefrom and having operative interconnection with said actuator shaft of said motor means.

6. The mirror assembly of claim 1, wherein said mirror assembly comprises:
(a) a support element being positioned within said mirror housing and being adjustable about a first axis with respect to said housing, said support element defining projection means;
(b) a mirror support being disposed within said housing and having pivotal connection with said projection means about a second axis disposed in substantially normal relation with said first axis;
(c) a first mirror segment being fixed to said mirror support;
(d) a pivotal mirror support having pivotal interconnection with said mirror support and having operative interconnection with said motor means;
(e) a movable mirror segment being fixed to said pivotal mirror support and being movable therewith;
(f) said motor means, when deenergized, positioning said movable mirror segment in substantially coplanar relation with said first mirror segment and upon energization, positioning said movable mirror segment in angulated relation with said first mirror segment.

7. The mirror assembly of claim 6, wherein:
said motor means is an electric motor in operative connection with said pivotal mirror support.

8. The mirror assembly of claim 6, wherein
said motor means is a vacuum actuated motor in operative connection with said pivotal mirror support.

9. The mirror assembly of claim 6, wherein:
said motor means is a pneumatic actuated motor in operative connection with said pivotal mirror support.

10. The mirror assembly of claim 1, including:
(a) an electric control circuit for energization of said motor means; and
(b) switch means for interconnecting the electric circuit system of said automotive vehicle, said switch means being operated by said turn signal lever of said automotive vehicle and being coupled with said electric control circuit, whereby selected positioning of said turn signal lever of said automotive vehicle actuates said switch to a position energizing said electric circuit and said motor means.

11. The mirror assembly of claim 1, wherein:
said mirror means is a single elongated flexible mirror, capable of being bent by the force applied thereto by said motor means.

12. The mirror assembly of claim 11, wherein a first portion of said elongated flexible mirror is maintained substantially planar and a second portion of said elongated flexible mirror is capable of being flexed to non coplanar relation with said first portion by force applied thereto by said motor means.

13. An automatically positionable mirror assembly for automotive vehicles having a turn signal system including a driver controlled turn signal lever, comprising:

(a) a first mirror segment being manually positionable by the operator of said automotive vehicle for a predetermined rear field of view;
(b) a second mirror segment being pivotally connected to said first mirror segment and being pivotally movable relative thereto;
(c) motor means being operatively interconnected with said second mirror segment and upon deenergization positioning said second mirror segment in substantially coplanar relation with said first mirror segment and upon energization positioning said second mirror segment in angulated relation to said first mirror segment; and
(d) a control circuit for said motor means incorporating a switch adapted for operative association with said turn signal lever for selective energization of said motor means by the electrical circuit of said automotive vehicle upon preselected positioning of said turn signal lever.

14. The mirror assembly of claim 13, wherein:
said motor means is an electric motor in operative interconnection with said second mirror segment.

15. The mirror assembly of claim 13, wherein:
said motor means is a vacuum actuated motor in operative interconnection with said second mirror segment.

16. The mirror assembly of claim 13, wherein:
said motor means is a pneumatically actuated motor in operative interconnection with said second mirror segment.

17. The mirror assembly of claim 13, wherein:
(a) said motor means has a linearly movable actuating shaft;
(b) said first mirror segment is manually adjustable for positioning thereof by the operator of said automotive vehicle;
(c) said angulated position of said second mirror segment being adjustable by adjustment of the effective length of said operating shaft of said motor means.

18. The mirror assembly of claim 13, including:
a housing being open at one side and containing said first and second mirror segments and positioning said first and second mirror segments for observation by the operator of said automotive vehicle, said housing being supported by said automotive vehicle.

19. The mirror assembly of claim 18, wherein:
(a) a mirror support is contained within said housing and supports said first and second mirror segments relative to said housing; and
(b) said motor means is connected to said mirror support and is operatively interconnected with said second mirror segment for movement of said second mirror segment relative to said first mirror segment.

20. The mirror assembly of claim 19, wherein:
(a) said mirror support is adjustable about "x" and "y" axes relative to said housing; and
(b) said operative interconnection of said motor means and said mirror support being capable of adjustment of the predetermined positions of said second mirror segment relative to said first mirror segment.

* * * * *